3,185,547
PREPARATION OF DIBORANE
Mack W. Hunt, Ponca City, Okla., assignor to Continental Oil Company, Ponca City, Okla., a corporation of Delaware
No Drawing. Filed Sept. 12, 1960, Ser. No. 55,130
6 Claims. (Cl. 23—204)

This invention relates to an improved process for the preparation of diborane through the reaction of dialkoxyaluminum hydride with a boron halide.

Heretofore, many methods have been proposed for the preparation of diborane, which is utilized as a component for high energy fuels. For example, diborane has been prepared either by the hydrolysis of magnesium boride, by the reaction of boron halide vapor and hydrogen in the presence of a metal, by the reaction of alkali metal hydride with boron halide, and by various other reactions. These methods have suffered from various disadvantages due to complexities of the reactions, poor yields, processing difficulties, etc. For example, in the process which utilizes alkali metal hydride and boron halide as reactants, problems are encountered due to the substantial insolubility of the hydride; thus it has been found necessary to utilize the hydride as a solid, in finely divided form. The hydrides also possess disadvantages in that they are inflammable in air and are thus very dangerous to handle.

It is an object of this invention to provide an improved process for the preparation of diborane.

It is another object of this invention to provide a process for the preparation of diborane which obviates certain disadvantages of the prior art processes.

Still another object of this invention is to provide a process whereby diborane can be prepared utilizing reactants in solution.

These and other objects of the invention will become more readily apparent from the following detailed description and discussion.

The foregoing objects are realized broadly by reacting a boron halide with a dialkoxyaluminum hydride.

In one aspect of the invention, the reactants are present in the reaction system in solution.

The alkoxides which are employed in the process of this invention include broadly materials having the formula:

$$Al(OR)_2H$$

in which R is an alkyl radical having a carbon content from about 1 to about 18 or higher. The alkyl radicals can be the same or different and are preferably those radicals having a carbon content varying from 1 to about 5. Specific alkoxides which can be used include materials such as dimethoxyaluminum hydride, diethoxyaluminum hydride, methoxyethoxyaluminum hydride, di-n-propoxyaluminum hydride, diisopropoxyaluminum hydride, di-n-hexoxyaluminum hydride, ethoxybutoxyaluminum hydride, di-n-butoxyaluminum hydride, diiso-octoxyaluminum hydride, di-n-decoxyaluminum hydride, di-n-dodecoxyaluminum hydride, and the like.

Generally, the dialkoxyaluminum hydrides are solids; however, the lower molecular weight materials can be liquids. At ordinary temperatures, for example, diisopropoxyaluminum hydride is a viscous clear liquid. On the other hand, diisobutoxyaluminum hydride is a milky semisolid at ordinary temperatures, and the higher molecular weight hydrides are solids, for example, the di-n-hexadecoxyaluminum hydride. The dialkoxyaluminum hydrides are very soluble in common solvents, such as aromatic hydrocarbons, for example, benzene, xylene, alkyl benzenes, and the like; aliphatic hydrocarbons, for example, those containing from about 5 to about 16; including normal hexane, cyclohexane, methylcyclopentane, and the like; also hydrocarbon fractions, such as naphthas, oxygenated hydrocarbon solvents, such as ethers, including diethyl ether, methyl ether, and dioxane. Preferably, the reaction is carried out with the dialkoxyaluminum hydride in solution of one of the foregoing solvents, since a solution provides improved contact between the reactants as compared to the use of dialkoxyaluminum hydride in the solid state.

The dialkoxyaluminum hydride employed in carrying out the process of this invention can be prepared by a variety of procedures, e.g., by the reaction of a dialkylaluminum hydride with a borate ester, by the reaction of an alkali metal aluminum hydride with an aluminum alkoxide, or by the reaction of aluminum hydride with an aluminum alkoxide. These reactions can be carried out broadly in a temperature range from about 25 to about 150° C. For a more detailed discussion of the hydrides and their method of preparation, reference is made to copending application of Mack W. Hunt, U.S. Serial No. 33,624, filed June 3, 1960.

Of the boron halides which are employed in carrying out the reaction, boron trifluoride is particularly suitable for use. In addition, however, the other boron halides, such as boron bromide, boron chloride, etc., can be employed in the process. The boron halide can be reacted with the dialkoxyaluminum hydride in the gaseous state; however, ordinarily, this material is present in the reaction system in solution. For this purpose, various organic solvents can be employed, including, for example, dimethyl ether, diethyl ether, dibutyl ether, dioxane, and the like. In carrying out the reaction, the reactants are preferably employed in substantially stoichiometric proportions or with an excess of the boron halide. The reaction can be carried out at room temperature and generally is effected within the range of about 0 and 100° C. The reaction is exothermic, and provision for removing heat to control the reaction can be made in any conventional manner.

In addition to the advantages already discussed, the reaction system of this invention is further advantageous in the use of dialkoxyaluminum hydrides in that these materials are not spontaneously inflammable in air. As a matter of fact, they do not react with air at an elevated rate. Another advantage of the process lies in the high product yield. Substantially all of the product obtained is diborane, indicating a high degree of selectivity for this product.

The following example is presented in illustration of the invention:

*Example 1*

A 200-ml., 3-necked flask was equipped with dropping funnel, cold finger condenser (with separate receiver), thermometer, and a nitrogen purge system. A total of 32.1 g. of diisopropoxyaluminum hydride in 50 g. of xylene was charged to the flask, and 29.0 g. of boron trifluoride etherate (boron trifluoride in diethyl ether) were added dropwise. The temperature rapidly rose to 50° C., and a gas was liberated. About halfway through the addition, a precipitation occurred, which is typical of aluminum fluoride compounds. Tubing was led from the top of the condenser through a cold trap to a gas scrubber containing triethylamine. The triethylamine was used to complex the diborane product.

The mixture was heated to reflux, and the major portion of the ether was collected in the separate receiver. The system was purged with nitrogen during the entire procedure.

After refluxing the xylene in the mixture for 2 hours, the scrubber was disconnected; and the reaction mass was allowed to cool. Analysis of the triethylamine solution showed that 78 percent of the available hydrogen was converted to gaseous diborane, which was the sole reaction product. This was confirmed by hydrolysis and infrared analysis. The triethylamine borane also exhibited the proper boiling point of 223° C. (corrected).

Example 2

A 300-ml., 3-necked flask was equipped with dropping funnel, cold finger condenser (with separate receiver), thermometer, and a nitrogen purge system. To the flask was charged 50.0 g. of di-n-hexadecoxyaluminum hydride $[Al(OC_{16}H_{19})_2H]$ and 50.0 g. of a solvent consisting of mixed alkylated benzenes with an average molecular weight of 300 (B.P. 220° at 20 mm.). The system was then thoroughly flushed with nitrogen, and 10.0 g. of boron trifluoride etherate (47 percent in diethyl ether) was added dropwise. The addition was made so that the temperature did not rise above 40° C. Tubing was led from the top of the condenser through a cold trap to a gas scrubber containing triethylamine. The triethylamine complexes with the diborane to form triethylamine borane. After the addition, the mixture was heated to 100–110° C. for 3 hours, and the ether was collected in the receiver below the cold finger condenser. The ether weighed 7.8 g. and corresponds to the 8.0 g. that is theoretically possible. During the entire procedure, the system was purged with a stream of nitrogen.

The triethylamine and triethylamine borane that was contained in the gas scrubber was transferred to a distillation setup, and the excess triethylamine was removed under reduced pressure and heat. The triethylamine borane weighed 3.0 g. which corresponds to 79 percent yield. This was confirmed by infrared analysis and by hydrolysis of the sample. Diborane was the only product obtained in the reaction.

While particular embodiments of the invention have been described, it will be understood, of course, that the invention is not limited thereto since many modifications may be made; and it is therefore contemplated to cover by the appended claims any such modifications as fall within the true spirit and scope of the invention.

The invention having thus been described, what is claimed and desired to be secured by Letters Patent is:

1. A process for the preparation of diborane which comprises reacting a dialkoxyaluminum hydride with a boron halide in the absence of air and subsequently recovering diborane from the resulting reaction product.

2. The process of claim 1 in which the reactants are diisopropoxyaluminum hydride and boron trifluoride.

3. A process for the preparation of diborane which comprises reacting a solution of dialkoxyaluminum hydride with a boron halide in the absence of air and subsequently recovering diborane from the resulting reaction product.

4. The process of claim 3 in which the dialkoxyaluminum hydride is diisopropoxyaluminum hydride and the solvent therefore is a hydrocarbon solvent.

5. The process of claim 4 in which the boron halide is boron trifluoride.

6. The process of claim 5 in which the boron halide is also in solution.

References Cited by the Examiner
UNITED STATES PATENTS

| | | | |
|---|---|---|---|
| 2,543,511 | 2/51 | Schlesinger et al. | 23—204 |
| 2,953,603 | 9/60 | Coyne | 23—204 X |

MAURICE A. BRINDISI, *Primary Examiner.*

ROGER L. CAMPBELL, *Examiner.*